UNITED STATES PATENT OFFICE 2,513,273

ACENAPHTHOYL ALKANOIC ACIDS AND DERIVATIVES THEREOF

Robert R. Burtner, Skokie, and John M. Brown, Chicago, Ill., assignors to G. D. Searle & Co., Skokie, Ill., a corporation of Illinois No Drawing. Application February 6, 1948, Serial No. 6,804

6 Claims. (Cl. 260—515)

This invention relates to acenaphthoylalkanoic acids, to salts and esters thereof, and to processes for producing such acids, salts and esters. In particular it relates to keto acids having the following general structural formula

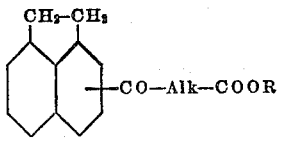

wherein Alk is an alkylene radical containing at least four carbon atoms attached through the carbonyl group to one of the benzenoid rings of the acenaphthene nucleus, and R is hydrogen, alkyl or a cation.

In the foregoing general formula Alk represents bivalent saturated aliphatic radicals of from four to ten carbon atoms. Such a radical is derived from a saturated aliphatic hydrocarbon, which may be straight- or branched-chain. Among the alkylene radicals which are within the scope of this invention are tetramethylene, pentamethylene and related polymethylene radicals up to and including octamethylene. Also within the scope of this invention are branched-chain alkylene radicals such as those existing in dibasic acids like ethylsuccinic, α-methylglutaric, β-methylglutaric, α-methyladipic, β-methyladipic, α-ethylglutaric, α-methylpimelic, β-methylazelaic, α-ethylsebaic, and the like.

The R group of the foregoing formula can be hydrogen, in which case the compound is a carboxylic acid. It can represent an alkyl radical, in which case the substance is an alkyl ester. When R is alkyl it is preferably a lower alkyl radical having 1 to 5 carbon atoms. R can also stand for an organic or inorganic cation derived from an organic or inorganic base by neutralization of the carboxylic acid. Among such cations are the sodium, potassium, calcium, ammonium, alkylammonium and related ions. Cations derived from the lower aliphatic and aliphatic-type amines having ionization constants in the range of $10^{-3}$ to $10^{-5}$ are also within the purview of this invention. Among such amines are the mono-, di- and trialkyl amines; the alkanolamines such as ethanolamine, isopropanolamine, diethanolamine and diethylaminoethanol; the strong heterocyclic amines which are aliphatic in character, including morpholine, piperidine, pyrrolidine and thiamorpholine; and aralkylamines such as benzylamine and phenethylamine.

Representative of the compounds which comprise this invention are the following:

A. δ-(5-acenaphthoyl) valeric acid, having the formula

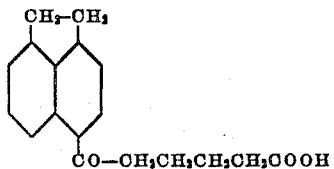

B. ω-(3-acenaphthoyl) capric acid, which has the formula

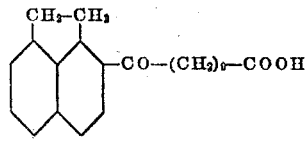

C. ω-(5-acenaphthoyl) pelargonic acid, having the formula

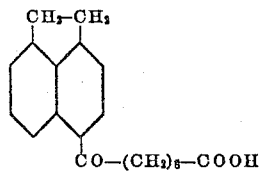

D. Sodium γ-(3-acenaphthoyl)-β-ethylbutyrate, which has the formula

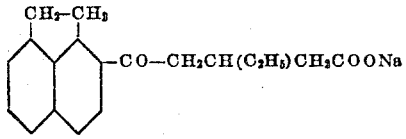

E. ω-(5-acenaphthoyl)-γ-methylcaproic acid, of the formula

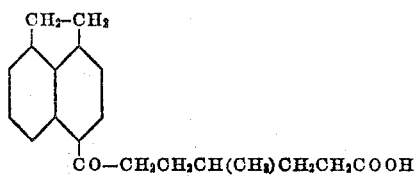

F. Bis-β-hydroxyethylammonium ω-(3-acenaphthoyl)-caprylate, which has the formula

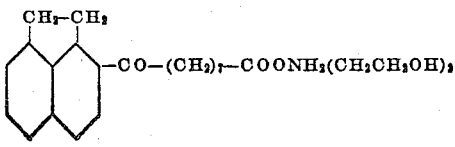

The compounds which comprise this invention can be produced by reacting acenaphthene with an anhydride or halide of a dibasic acid containing at least six carbon atoms in the presence of a Friedel-Crafts catalyst such as anhydrous aluminum chloride, anhydrous ferric chloride, stannic chloride, boron trifluoride, anhydrous zinc chloride, hydrogen fluoride and related compounds. Solvents for these reactions should be selected from substances of lower reactivity than acenaphthene, such as nitrobenzene, carbon disulfide, tetrachloroethane, chlorobenzene, benzene and similar compounds. The reactions can also be carried out using a monoester monohalide of a dibasic acid under the foregoing conditions. Among the dibasic acid anhydrides and halides which can be used in the foregoing processes to prepare the substances of this invention are adipic, pimelic, suberic, azelaic, sebacic, and the like, as well as alkylated derivatives of these acids such as those disclosed hereinabove.

Alkaline salts of these acids may be prepared by solution of the acid in an alkaline carbonate solution, such as sodium carbonate, followed by salting-out with a salt, as for example sodium chloride. Likewise such salts may be prepared by treatment of an alcoholic solution of the acid with an alcoholic solution of alkali. The salts are often insoluble in the alcohol and may be obtained as precipitates. In other cases another solvent such as ether or benzene may be added to throw down the salt. Salts of aliphatic amines may be obtained by treating a solution of the acid in an organic solvent with a solution of the amine in a similar solvent and precipitating the desired salt with another miscible solvent in which the salt is insoluble.

The compounds of this invention are useful as intermediates in the preparation of complex organic molecules such as dye intermediates and steroidal compounds. They are also useful as therapeutic agents. Certain of them are of use as plasticizers, mold inhibitors, antiseptics, fungicides and as components of insecticides.

Our invention is further disclosed by means of the following examples, which are set forth for the purpose of illustration and which in no way are to be construed as limiting our invention in spirit or in scope. It will be apparent to those skilled in the art that innumerable conventional modifications in solvent, temperature, catalyst and reagents can be adopted without departure from the intent and purpose of this invention. Quantities of materials are given in parts by weight unless otherwise noted.

*Example 1*

A solution of 218 parts of adipic anhydride and 185 parts of acenaphthene in 1450 parts of nitrobenzene is cooled to 0° centigrade. To it are added in small portions 319 parts of anhydrous aluminum chloride, the reaction temperature being maintained at 5–8° C. The mixture is stirred for an hour at 5° C. after the addition is complete. After standing overnight at room temperature, the reaction mixture is poured onto 2000 parts of ice containing 236 parts of concentrated hydrochloric acid. The nitrobenzene is removed by steam distillation, and the residue is chilled and filtered. The filter cake is ground with water and washed. It is extracted with 3000 parts of boiling 5% sodium carbonate solution for 1 hour. The extract is filtered, and the filtrate acidified. The resulting precipitate is collected on a filter, washed and dried. It is taken up in about 500 parts of boiling methanol containing 73.5 parts of concentrated sulfuric acid, and refluxed for 6 hours. The solution is concentrated to about ⅓ its volume by evaporation under reduced pressure. The concentrate is then poured into 1500 parts of water containing 186 parts of sodium carbonate. The resulting mass is extracted with ether and then with benzene. The combined extracts are washed with water, filtered, and evaporated. The residue is taken up in 220 parts of hot alcohol and chilled. Yellow crystals of methyl δ-(3-acenaphthoyl)valerate separate. These are collected on a filter, washed, and dried. This material is recrystallized from methanol and melts at 95–96° C.

4 parts of methyl δ-(3-acenaphthoyl)valerate are dissolved in 10 parts of alcohol and refluxed for ½ hour with 1.5 parts of potassium hydroxide in 10 parts of alcohol. The solution is poured onto 100 parts of ice containing 6.5 parts of concentrated hydrochloric acid. The precipitated δ-(3-acenaphthoyl)valeric acid is removed by filtration and dried. After recrystallization from a mixture of acetic acid and alcohol, it melts at 161–163° C.

*Example 2*

The alcoholic mother liquor obtained from the recrystallization of methyl δ-(3-acenaphthoyl)-valerate (Example 1) is evaporated to dryness. The residue of methyl δ-(5-acenaphthoyl)valerate is dissolved in 37 parts of alcohol containing 5.3 parts of potassium hydroxide, and refluxed for ½ hour. The reaction mixture is poured into dilute hydrochloric acid, and an oily precipitate forms which soon granulates. This is removed and dried. It is extracted with boiling toluene. The toluene solution, on chilling, gives crystals of δ-(5-acenaphthoyl)valeric acid (compound A) which, on recrystallization from ethyl acetate, melt at 115–118° C.

*Example 3*

154 parts of acenaphthene and 184 parts of sebacic anhydride in 1200 parts of nitrobenzene cooled to 5–10° C. are treated with 266 parts of anhydrous aluminum chloride, added portionwise with stirring over 50 minutes. The reaction mixture is stirred for 3 hours at ice temperature, and then allowed to stand at room temperature. It is poured onto 2000 parts of ice containing 350 parts of concentrated hydrochloric acid, and the nitrobenzene is removed by steam distillation. The residue on chilling precipitates sebacic acid, which is removed by decantation. The semi-solid which remains is taken up in 5000 parts of water at 90° C. containing 80 parts of sodium hydroxide. The alkaline solution is treated with decolorizing charcoal, centrifuged, and the supernatant liquid is decanted and acidified. The precipitate is filtered, washed, and pressed dry. It is dissolved in 600 parts of boiling benzene and filtered hot with decolorizing charcoal. The filtrate is diluted with petroleum ether to precipitate more sebacic acid. The sebacic acid is removed by filtration, and the filtrate is evaporated to dryness. The residue so obtained is taken up in about 600 parts of boiling cyclohexane, filtered with decolorizing charcoal, and chilled. The precipitate is removed by decantation, suspended in about 200 parts of ether, filtered, and washed with 50 parts of cold water. The ether filtrate is evaporated, and the residue taken up in 350 parts of hot water containing 17 parts of sodium carbonate. 33 parts of sodium chloride are added to the hot solution, which is then chilled. The sodium salt of ω-(5-acenaphthoyl)pelargonic acid is filtered. This salt is taken up in 500 parts of water at 75° C. The cold solution is acidified, and the precipitated acid is extracted with ether. The ether is dried with anhydrous sodium sulfate and evaporated. The residue is recrystallized from about 500 parts of cyclohexane. ω-(5-acenaphthoyl)pelargonic acid (Compound C) is recrystallized from benzene diluted with petroleum ether and from benzene, and forms pale yellow crystals melting at 100–101° C.

We claim:

1. A new composition of matter having the formula

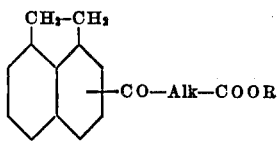

wherein Alk is an alkylene radical containing at least four and not more than ten carbon atoms and R is a member of the group consisting of hydrogen, lower alkyl radicals and alkali metals, and wherein the side chain, —CO—Alk—COOR, is attached to one of the positions numbered 3 and 5 in the acenaphthene nucleus.

2. A new composition of matter having the formula

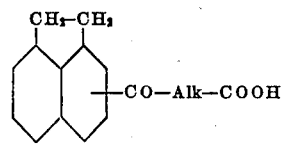

wherein Alk is an alkylene radical containing at least four and not more than ten carbon atoms, and wherein the oxyalkanoic acid side chain is attached to one of the positions numbered 3 and 5 in the acenaphthene nucleus.

3. A 3-acenaphthoylalkanoic acid, wherein the alkanoic acid group contains at least five and not more than eleven carbon atoms.

4. A 5-acenaphthoylalkanoic acid, wherein the alkanoic acid group contains at least five and not more than eleven carbon atoms.

5. δ-(3-acenaphthoyl)valeric acid.

6. δ-(5-acenaphthoyl)valeric acid.

ROBERT R. BURTNER.
JOHN M. BROWN.

REFERENCES CITED

The following references are of record in the file of this patent:

Graebe et al.: Ann. der Chemie, vol. 327, page 99 (1903).

Fieser: "Organic Synthesis," vol. 20, pages 1–5, Wiley & Sons, Inc. New York (1940).